United States Patent
Aharoni et al.

(10) Patent No.: US 10,579,301 B1
(45) Date of Patent: Mar. 3, 2020

(54) PROCESSING PLATFORM CONFIGURED TO ESTIMATE STORAGE SYSTEM PERFORMANCE UTILIZING PROCESSOR CHARACTERISTICS

(71) Applicant: EMC IP Holding Company LLC, Hopkinton, MA (US)

(72) Inventors: Dan Aharoni, Brookline, MA (US); Rui Ding, Wilmington, MA (US); Mingjie Zhou, Ashland, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/241,599

(22) Filed: Jan. 7, 2019

(51) Int. Cl.
*G06F 3/06* (2006.01)

(52) U.S. Cl.
CPC .......... *G06F 3/0653* (2013.01); *G06F 3/0604* (2013.01); *G06F 3/067* (2013.01)

(58) Field of Classification Search
CPC ....... G06F 3/0653; G06F 3/067; G06F 3/0604
See application file for complete search history.

(56) References Cited

U.S. PATENT DOCUMENTS

| | | | |
|---|---|---|---|
| 7,292,969 B1 | 11/2007 | Aharoni et al. | |
| 7,356,452 B1 * | 4/2008 | Naamad | G06F 11/3457 703/22 |
| 7,603,372 B1 * | 10/2009 | Honicky, Jr. | G06F 11/3414 |
| 8,868,797 B1 * | 10/2014 | Kirac | G06F 3/061 710/15 |
| 9,569,569 B1 * | 2/2017 | Colon | G06F 17/5022 |
| 9,830,626 B1 * | 11/2017 | Aharoni | G06Q 30/0631 |
| 10,152,339 B1 * | 12/2018 | Dong | G06F 17/50 |
| 2015/0286409 A1 * | 10/2015 | Chandra | G06F 3/0604 711/170 |
| 2016/0124652 A1 | 5/2016 | Adamson et al. | |

OTHER PUBLICATIONS

Dell EMC, "Dell EMC VxRack FLEX," Dell, Inc., 2018, 5 pages.
stackoverflow.com, "Estimating How Processor Frequency Affects I/O Performance," https://stackoverflow.com/questions/6996966/estimating-how-processor-frequency-affects-i-o-performance, Dec. 20, 2018, 3 pages.

* cited by examiner

*Primary Examiner* — Hiep T Nguyen
(74) *Attorney, Agent, or Firm* — Ryan, Mason & Lewis, LLP

(57) ABSTRACT

A processing platform is configured to communicate over a network with one or more client devices, and to receive a request from a given one of the client devices for a proposed configuration of a storage system. The processing platform identifies based at least in part on the received request at least one processor to be utilized in implementing the storage system, selects a particular one of a plurality of storage system performance models based at least in part on the identified processor, computes a performance metric for the storage system utilizing the selected storage system performance model and one or more characteristics of the identified processor, generates presentation output comprising: (i) the performance metric, and (ii) information characterizing at least a portion of the proposed configuration of the storage system, and delivers the presentation output to the given client device over the network.

20 Claims, 11 Drawing Sheets

FIG. 3C

PROCESSING PLATFORM CONFIGURED TO ESTIMATE STORAGE SYSTEM PERFORMANCE UTILIZING PROCESSOR CHARACTERISTICS

FIELD

The field relates generally to information processing systems, and more particularly to tools for simulating or otherwise estimating storage system performance.

BACKGROUND

Storage system performance is typically characterized by throughput metrics such as input/output operations per second (IOPS). In configuring a storage system, a customer, administrator or other user generally wants assurances that the particular configuration selected will have a very high likelihood of meeting the desired IOPS levels for its intended application environment. Unfortunately, this can be problematic under current practice. For example, the advent of software-defined storage that can run on any of a wide variety of different types of general-purpose servers or other commodity hardware has vastly increased the number of storage system configuration options that are available to users. As a result, it is generally not possible to test each and every such storage system configuration in order to ensure that it will meet IOPS requirements when deployed. It is therefore possible that a given configured storage system when actually deployed in the field may not provide the IOPS performance that was expected by its purchaser. A need therefore exists for improved techniques for estimating performance of storage systems prior to deployment but without the need for explicit testing of their particular configurations.

SUMMARY

Illustrative embodiments provide techniques for estimating storage system performance as a function of characteristics of one or more candidate processors proposed for implementation within the storage system. Such techniques can advantageously provide highly accurate and efficient estimates of IOPS performance for a given storage system configuration without the need for explicit testing of that configuration. Accordingly, these and other embodiments are particularly well-suited for use with estimating performance of storage systems that are implemented at least in part using software-defined storage that can run on general-purpose servers or other commodity hardware.

In an illustrative embodiment, an apparatus comprises a processing platform, with the processing platform including a plurality of processing devices. The processing platform is configured to communicate over a network with one or more client devices, and to receive a request from a given one of the client devices for a proposed configuration of a storage system. The processing platform identifies based at least in part on the received request at least one processor to be utilized in implementing the storage system, selects a particular one of a plurality of storage system performance models based at least in part on the identified processor, computes a performance metric for the storage system utilizing the selected storage system performance model and one or more characteristics of the identified processor, generates presentation output comprising: (i) the performance metric, and (ii) information characterizing at least a portion of the proposed configuration of the storage system, and delivers the presentation output to the given client device over the network.

By way of example, the processing platform illustratively implements a web-based sizing tool configured to perform at least portions of the above-described receiving, identifying, selecting, computing, generating and delivering. Numerous other alternative processing platform arrangements are possible.

The performance metric for the storage system is advantageously computed in some embodiments utilizing the selected storage system performance model and one or more characteristics of the identified processor without requiring any testing of the proposed configuration of the storage system. Such an arrangement illustratively involves applying a function of the one or more characteristics of the identified processor as input to the selected storage system performance model.

In some embodiments, the one or more characteristics of the identified processor comprise at least one of a frequency of the processor, a power of the processor, a number of cores of the processor, and a benchmark performance level of the processor, although additional or alternative characteristics can be used. The benchmark performance level of the processor illustratively comprises at least one of a published integer processing performance level of the processor and a published floating point processing performance level of the processor. The published integer processing performance level of the processor and the published floating point processing performance level of the processor can more particularly comprise respective SPECint and SPECfp performance levels.

The selected storage system performance model in some embodiments of this type illustratively receives as its input a value computed as a function of two or more of the frequency, the power, the number of cores and the benchmark performance level.

For example, the selected storage system performance model may receive as its input a product of the frequency and the power.

As another example, the selected storage system performance model may receive as its input a product of the frequency, the power and the benchmark performance level, divided by the number of cores.

Numerous other functions of two or more of the frequency, the power, the number of cores and the benchmark performance level can be used in other embodiments.

The plurality of storage system performance models illustratively comprise at least a first set of one or more models for processors of a first type, and a second set of one or more models for processors of a second type different than the first type.

At least a subset of the plurality of storage system performance models comprise respective linear regression models, although numerous additional or alternative models can be used in illustrative embodiments.

These and other illustrative embodiments include, without limitation, methods, apparatus, information processing systems, and computer program products comprising processor-readable storage media.

BRIEF DESCRIPTION OF THE DRAWINGS

FIGS. 3A through 3D show example screenshots of a sizing tool for estimating storage system performance utilizing processor characteristics in an illustrative embodiment. These figures are collectively referred to herein as FIG. 3.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
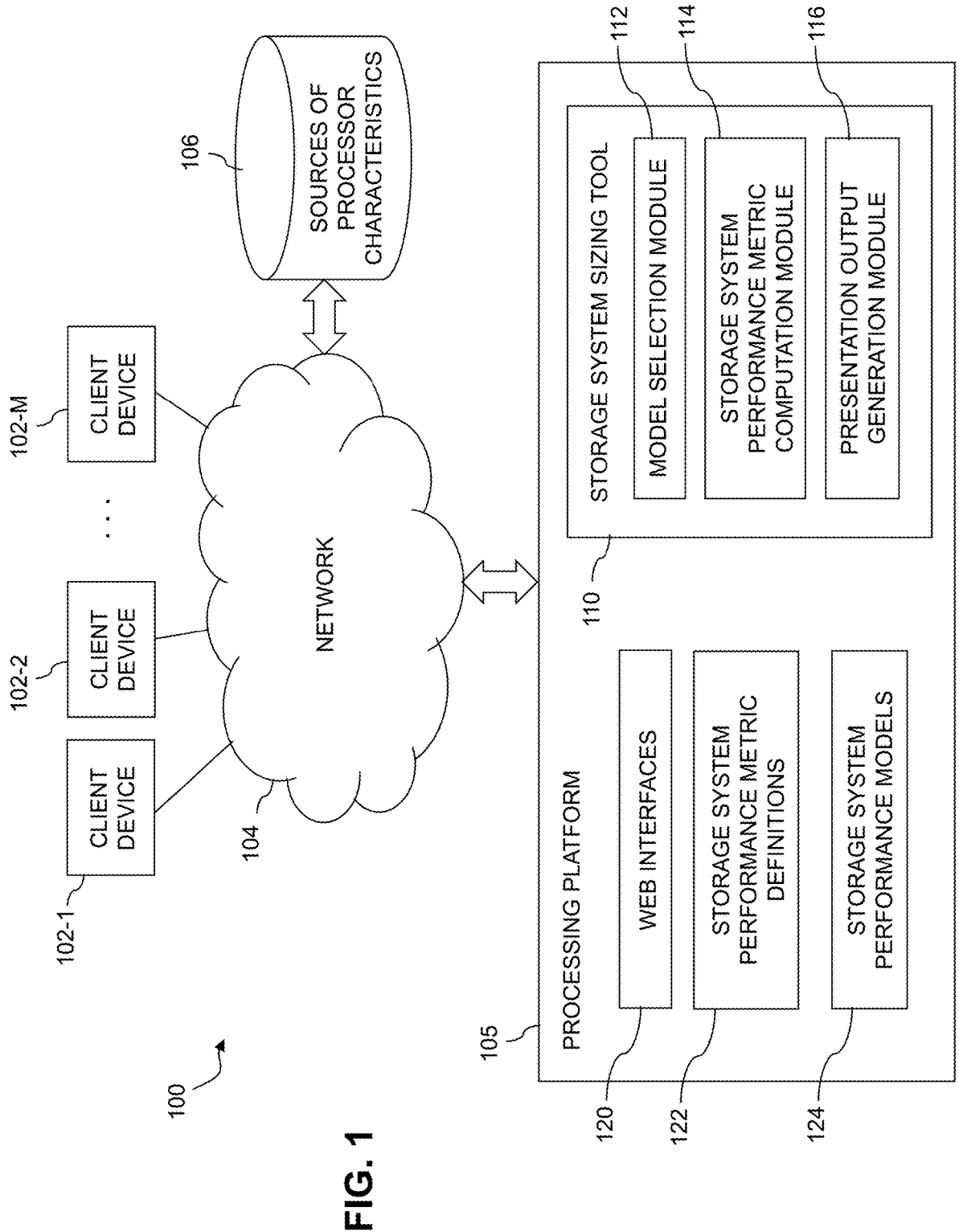
FIG. 1 is a block diagram of an information processing system comprising a processing platform implementing a sizing tool for estimating storage system performance utilizing processor characteristics in an illustrative embodiment.

FIG. 1 shows an information processing system 100 configured in accordance with an illustrative embodiment. The information processing system 100 comprises a plurality of client devices 102-1, 102-2, . . . 102-M configured to communicate over a network 104 with a processing platform 105. Also coupled to the network 104 are a plurality of sources 106 of processor characteristics, collectively illustrated as a database.

The processing platform 105 comprises a storage system sizing tool 110 that includes a model selection module 112, a storage system performance metric computation module 114, and a presentation output generation module 116.

Also included in the processing platform 105 are additional components comprising a plurality of web interfaces 120, storage system performance metric definitions 122 and storage system performance models 124.

The processing platform 105 is assumed to comprise a plurality of processing devices each having a processor coupled to a memory. One or more such processing devices may be implemented at least in part utilizing one or more virtual machines, containers or other types of virtualization infrastructure. Examples of processing platform implementations will be described below in conjunction with FIGS. 5 and 6.

It should be noted that the term "processing device" as used herein refers generally to a hardware-based device that incorporates processor and memory components, and can therefore include a virtual device that runs on underlying hardware. Such a device should not be construed as referring solely to particular types of storage drives such as hard disk drives (HDDs) or solid state drives (SSDs).

The processing platform 105 in some embodiments more particularly comprises at least a portion of a cloud-based data center or other cloud-based computer system, although other types of processing platforms may be used in other embodiments. For example, in some embodiments, the processing platform 105 can be part of an enterprise-based computer system rather than a cloud-based computer system.

A given cloud-based implementation of processing platform 105 illustratively includes commercially-available cloud infrastructure, such as an allocated portion of an Amazon Web Services (AWS) system. Other examples of cloud-based systems that can be used to implement one or more processing platforms of system 100 include Google Cloud Platform (GCP) and Microsoft Azure.

A cloud-based system of this type illustratively comprises a Platform-as-a-Service (PaaS) layer overlying an Infrastructure-as-a-Service (IaaS) layer. The IaaS layer in some embodiments comprises a plurality of virtual machines supporting application containers of the PaaS layer. For example, host devices in such an embodiment illustratively correspond to respective ones of the virtual machines of the IaaS layer. One or more additional or alternative layers may be used in implementing the processing platform 105, including by way of example a Function-as-a-Service (FaaS) layer.

The processing platform 105 is assumed to be accessible to a plurality of system users. The term "user" in this context and elsewhere herein is intended to be broadly construed so as to encompass, for example, human, hardware, software or firmware entities, as well as various combinations of such entities. At least some of the system users can be associated with respective ones of the client devices 102.

The client devices 102 associated with system users can include, for example, desktop, laptop or tablet computers, mobile telephones, or other types and arrangements of devices that support user interfaces to functionality of system 100.

The network 104 may comprise any of a variety of different types of networks, including by way of example a global computer network such as the Internet, a wide area network (WAN), a local area network (LAN), a satellite network, a telephone or cable network, a cellular network, a wireless network such as a WiFi or WiMAX network, or various portions or combinations of these and other types of networks.

The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art. The term "network" as used herein is intended to be broadly construed, and may encompass, for example, an internal network of a given system over which client devices 102 access processing platform 105.

Although only a single processing platform 105 is shown in this embodiment, the system 100 can comprise one or more additional processing platforms, each possibly associated with a different set of client devices 102.

In some embodiments, the client devices 102 comprise respective web browsers configured to interact with the storage system sizing tool 110 of the processing platform 105 via the web interfaces 120.

The client devices 102 illustratively generate requests for proposed configurations of storage systems from the storage system sizing tool 110. For example, a given one of the client devices 102 can interact over network 104 with the storage system sizing tool 110 in order to determine one or more proposed storage system configurations that meet specified requirements of a corresponding user.

A given such storage system in an illustrative embodiment comprises a VxRack™ FLEX rack-scale hyper-converged infrastructure system commercially available from Dell EMC of Hopkinton, Mass. A given VxRack™ FLEX system creates a server-based storage area network (SAN) by combining virtualization software, referred to as VxFlex OS, with Dell EMC PowerEdge servers to deliver flexible, scalable performance, and capacity on demand. Local storage resources are combined to create a virtual pool of block storage with varying performance tiers. The VxRack FLEX system architecture can be scaled from as few as four nodes to over a thousand nodes.

A wide variety of other types of storage systems can be implemented in illustrative embodiments, possibly utilizing software-defined storage products such as ScaleIO™ and ViPR® from Dell EMC. The term "storage system" as used herein is therefore intended to be broadly construed. For example, a storage system is not limited to SAN configurations, but can more generally comprise network-attached storage (NAS), direct-attached storage (DAS) and distributed DAS, as well as combinations of these and other storage types, possibly incorporating software-defined storage.

Other examples of particular types of storage products that can be used in implementing storage systems in illustrative embodiments include all-flash and hybrid flash storage arrays such as Unity™, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

Although shown as separate from the processing platform 105 in the FIG. 1 embodiment, one or more of the client devices 102 and/or one or more of the sources 106 in other embodiments can be part of the same processing platform that implements the functionality of the storage system sizing tool 110.

In operation, the processing platform 105 receives a request from a given one of the client devices 102 for a proposed configuration of a storage system, and identifies based at least in part on the received request at least one processor to be utilized in implementing the storage system. For example, a particular candidate processor can be explicitly specified in the request, or can be inferred from information in the request. The request is illustratively received via one of the web interfaces 120.

A particular such "request" as that term is broadly used herein can encompass multiple separate communications between the given one of the client devices 102 and the processing platform 105. The request can be generated by user interaction with web pages or other interfaces supported by the processing platform 105. Examples of such interfaces are shown in FIGS. 3A through 3D and will be described in more detail below.

The model selection module 112 of the storage system sizing tool 110 selects a particular one of the storage system performance models 124 based at least in part on the identified processor. At least a subset of the storage system performance models 124 comprise respective linear regression models, although other types of storage system performance models can be used in other embodiments.

The storage system performance metric computation module 114 of the storage system sizing tool 110 computes a performance metric for the storage system utilizing the selected storage system performance model and one or more characteristics of the identified processor. The performance metric is computed in accordance with a particular one of the storage system performance metric definitions 122. For example, the performance metric for the storage system illustratively comprises a throughput metric for the storage system, such as an IOPS metric for the storage system. Advantageously, the performance metric for the storage system is computed utilizing the selected storage system performance model and one or more characteristics of the identified processor without requiring any testing of the proposed configuration of the storage system.

The one or more characteristics of the identified processor are illustratively obtained from one or more of the sources 106, which in the present embodiment are assumed to be external to the processing platform 105. Additionally or alternatively, other sources of processor characteristics, possibly including internal databases or other types of sources that are internal to the processing platform 105, can be used to obtain the one or more characteristics of the identified processor.

In some embodiments, computing a performance metric for the storage system utilizing the selected storage system performance model and one or more characteristics of the identified processor comprises applying a function of the one or more characteristics of the identified processor as input to the selected storage system performance model.

The identified processor illustratively comprises a central processing unit (CPU) or a set of CPUs to be utilized in respective servers that will form a portion of the storage system, although other types of processors and corresponding storage system implementations can be used in other embodiments.

The one or more characteristics of the identified processor illustratively comprise publicly available standard processor characteristics such as at least one of a frequency of the processor, a power of the processor, a number of cores of the processor, and a benchmark performance level of the processor. Such processor characteristics in illustrative embodiments comprise simple characteristics that are typically part of the basic description of a given CPU. Utilization of processor characteristics of this type simplifies the model-based estimation and yet can provide highly accurate estimates of IOPS or other performance metrics for a given storage system configuration.

The frequency of the processor illustratively refers to its typical operating clock frequency, and the power refers to its typical power consumption, although other measures of frequency and power can be used.

The benchmark performance level of the processor illustratively comprises at least one of a published integer processing performance level of the processor and a published floating point processing performance level of the processor. The published integer processing performance level of the processor and the published floating point processing performance level of the processor can more particularly comprise respective SPECint and SPECfp performance levels, where SPEC denotes Standard Performance Evaluation Corporation.

Additional or alternative processor characteristics of other types can be used. For example, publically known evaluation results determined by applying other SPEC test suites to the processor can be used.

In some embodiments, the selected storage system performance model receives as its input a value computed as a function of two or more of the frequency, the power, the number of cores and the benchmark performance level.

For example, the selected storage system performance model can receive as its input a product of the frequency and the power. Additional embodiments of this type are described below in conjunction with FIGS. 4A and 4B.

As another example, the selected storage system performance model can receive as its input a product of the frequency, the power and the benchmark performance level, divided by the number of cores of the processor. An additional embodiment of this type is described below in conjunction with FIG. 4C.

The presentation output generation module 116 of the storage system sizing tool 110 generates presentation output that illustratively comprises the performance metric, possibly in combination with information characterizing at least a portion of the proposed configuration of the storage system. For example, the presentation output can comprise at least portions of one or more web pages in embodiments in which the storage system sizing tool 110 more particularly comprises a web-based sizing tool. The presentation output generated by the presentation output generation module 116 is delivered by the processing platform 105 to the given one of the client devices 102 over the network 104. Multiple distinct instances of presentation output can be generated and sent in conjunction with the processing of a particular request for a proposed configuration of a storage system.

Illustrative embodiments are particularly well-suited for use in estimating the performance of storage systems that include software-defined storage that can run on any of a wide variety of different types of general-purpose servers or other commodity hardware, for which there are potentially large numbers of different candidate processor options.

As indicated previously, such arrangements have vastly increased the number of storage system configuration options that are available to users, but it is generally not possible to test each and every such storage system configuration in order to ensure that it will meet IOPS requirements when deployed. For example, in storage systems based on software-defined storage, even if limits are placed on the type of servers, operating system version, chassis options and other parameters, the number of permutations based on processor characteristics, such as CPU type, frequency, power, performance and number of cores, is still very high. With so many options, it is not realistic to attempt to acquire and test all such distinct systems and empirically measure the maximum IOPS performance per CPU type.

These and other difficulties are overcome in illustrative embodiments disclosed herein, which advantageously avoid the need for explicit testing of each possible processor configuration, while also providing a high degree of assurance that a given configured storage system when actually deployed in the field will provide the IOPS performance that was expected by its purchaser.

As mentioned above, the processor characteristics utilized in estimating storage system performance illustratively include publicly available standard processor characteristics, such as frequency of the processor, a power of the processor, a number of cores of the processor, and a benchmark performance level of the processor.

In some embodiments, a customer or other user utilizes the storage system sizing tool 110 to estimate the achievable IOPS performance of a given proposed configuration of a storage system. The user can specify in its request to the storage system sizing tool 110 its particular requirements for the storage system, possibly in terms of parameters such as capacity, latency and desired IOPS performance. The request in some cases can include a specific indication of a particular processor or set of processors, as in the embodiment of FIG. 3C which allows the user to specify particular CPUs and numbers of cores for those CPUs. Alternatively, the storage system sizing tool 110 can infer a particular processor or set of processors from the requirements in the request and then include that processor or set of processors in the proposed configuration of the storage system.

The above-described operations of the storage system sizing tool 110 of the processing platform 105 are implemented at least in part utilizing one or more of the model selection module 112, storage system performance metric computation module 114 and presentation output generation module 116 of the storage system sizing tool 110.

The processing platform 105 is illustratively configured to perform various types of automated decision making and other automated processing utilizing additional or alternative outputs generated by the storage system sizing tool 110. For example, the processing platform 105 can implement machine learning algorithms or other types of artificial intelligence (AI) configured to autonomously direct the storage system sizing tool 110 to particular optimal storage system configurations.

The processing platform 105 can include additional or alternative components in other embodiments. For example, the processing platform 105 can include an analytics engine implemented in or otherwise associated with the storage system sizing tool 110. Such an analytics engine can be utilized to process data relating to interactions between the storage system sizing tool 110 and system users in order to facilitate dynamic adjustments in one or more of the storage system performance models or other aspects of the system 100. For example, feedback from one or more system users may be used by the sizing tool 110 to recommend or otherwise select particular processors to be used in a given proposed configuration. It is also possible for the sizing tool 110 to select different processors dynamically in the course of its interactions with one or more system users. Some embodiments can configure the sizing tool 110 to operate in an automated manner in conjunction with a storage system manufacturing process in order to dynamically determine appropriate storage system configurations to be manufactured to satisfy particular requirements.

It is to be appreciated that components of the processing platform 105 can be implemented within respective separate physical systems in some embodiments. A processing platform such as the processing platform 105 in the FIG. 1 embodiment can therefore be implemented as a combination of multiple distinct physical systems or as a single physical system. Accordingly, the particular arrangement of processing platform 105 and its components as shown in FIG. 1 is presented by way of example only.

In other embodiments, only subsets of these components, or additional or alternative sets of components, may be used, and such components may exhibit alternative functionality and configurations. In addition, as previously noted, at least a subset of the client devices 102 may be part of the same processing platform that is used to implement at least a portion of the processing platform 105.

The operation of the information processing system 100 will now be described in further detail with reference to the flow diagram of the illustrative embodiment of FIG. 2. This figure illustrates a process that includes steps 200 through 210, and is suitable for use in system 100 but is more generally applicable to other types of information processing systems that implement techniques for estimating storage system performance as a function of characteristics of one or more candidate processors.

Figure 2:
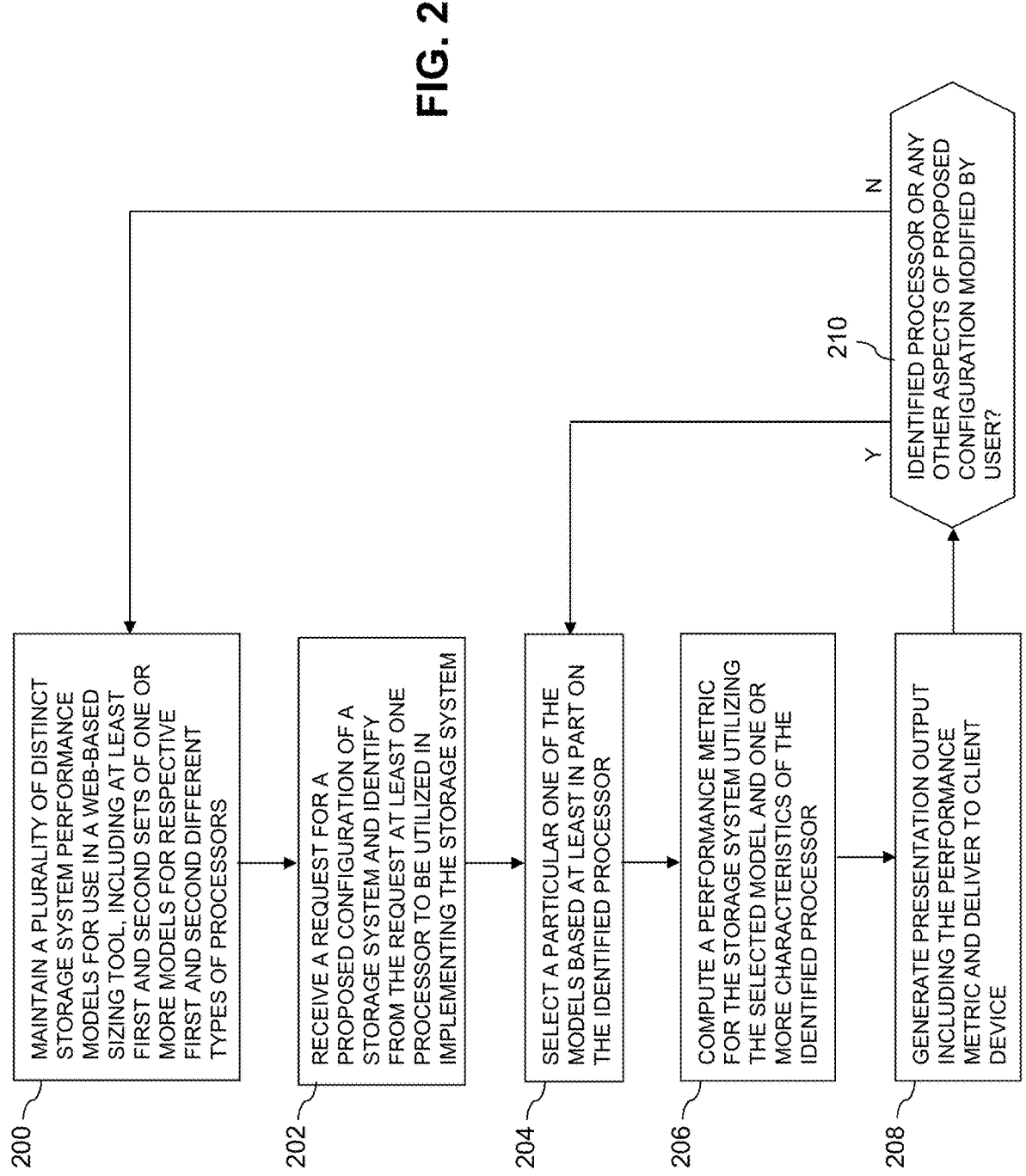
FIG. 2 is a flow diagram of an exemplary process for estimating storage system performance utilizing processor characteristics in an illustrative embodiment.

The steps of the flow diagram of FIG. 2 in some implementations are illustratively performed at least in part under the control of the storage system sizing tool 110 in the processing platform 105 of system 100 utilizing internal components of the storage system sizing tool 110 such as the model selection module 112, the storage system performance metric computation module 114 and the presentation output generation module 116. Accordingly, these components of the storage system sizing tool 110 can comprise program code that implements respective corresponding portions of the FIG. 2 process.

Figure 4A:
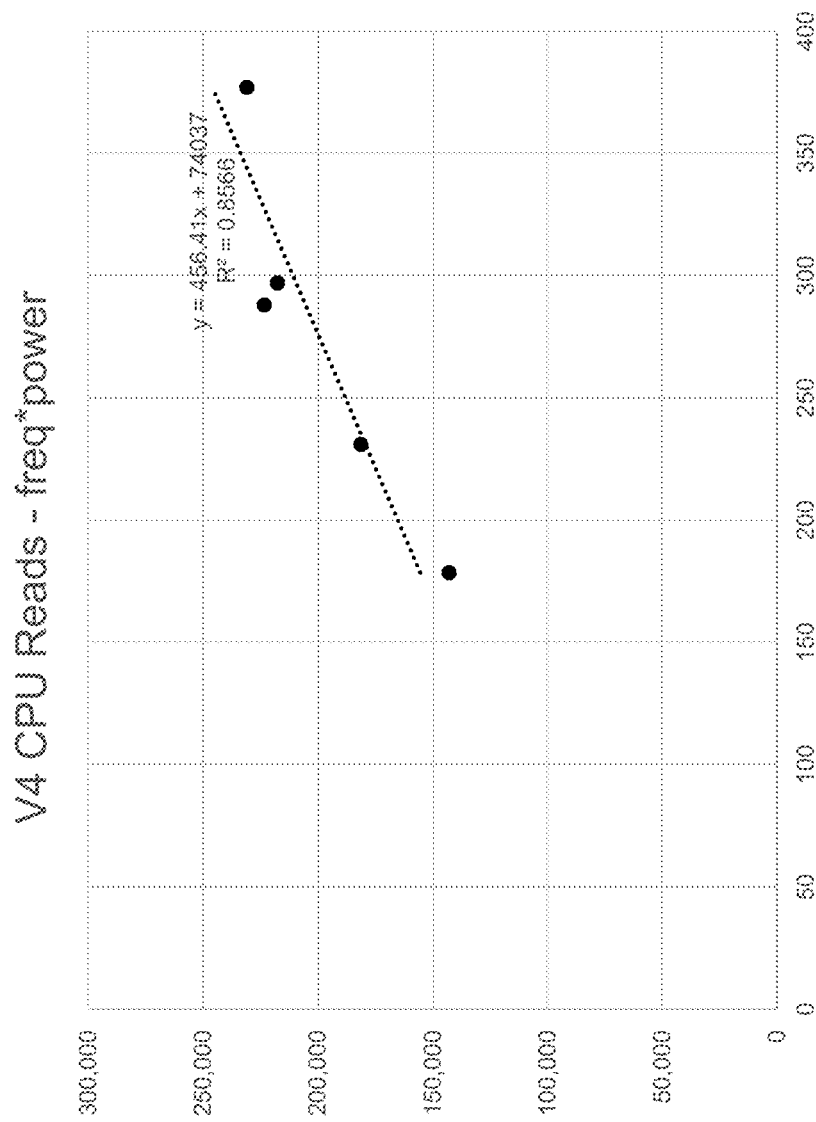
FIGS. 4A through 4C show graphical plots of storage system performance estimated utilizing processor characteristics in illustrative embodiments. These figures are collectively referred to herein as FIG. 4.
Figure 4B:
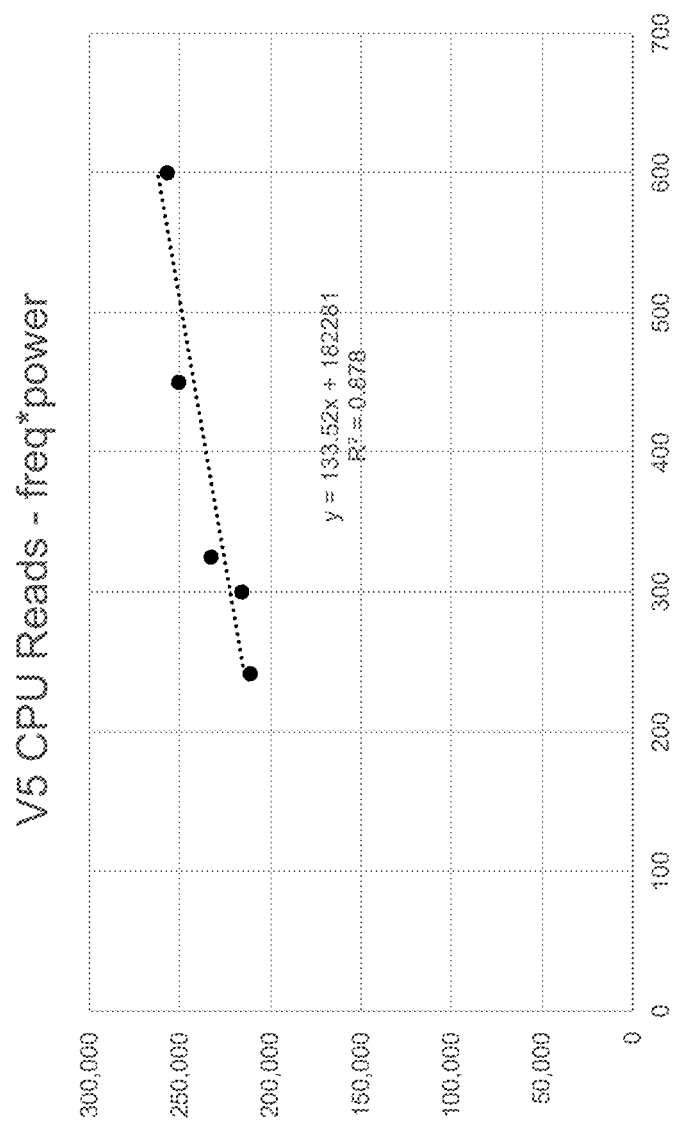
Figure 4C:
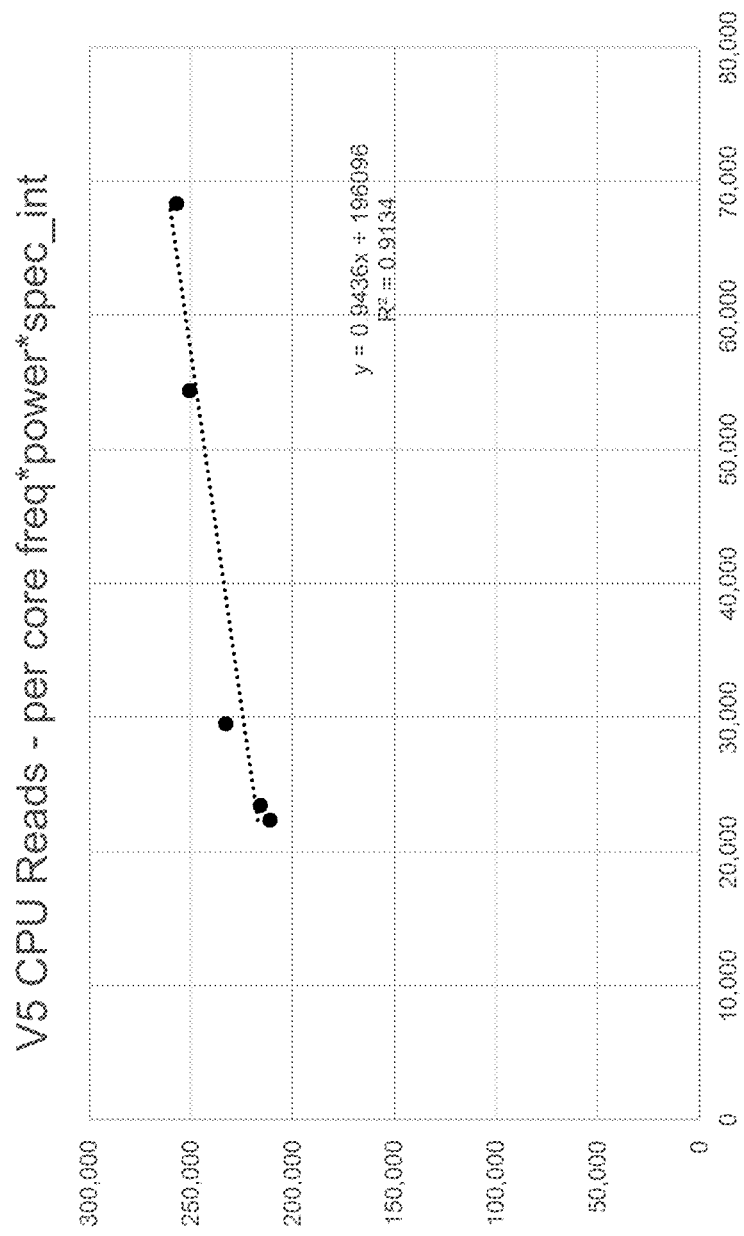

In step 200, a plurality of distinct storage system performance models are maintained for use in a web-based sizing tool. The distinct storage system performance models illustratively include at least first and second sets of one or more models for respective first and second different types of processors. The multiple models can be maintained outside of the web-based sizing tool, possibly in a corresponding processing platform as in the embodiment of FIG. 1. Additionally or alternatively, at least a subset of the models can be maintained at least in part within the web-based sizing tool itself. The term "maintaining" as used herein is therefore intended to be broadly construed, and can encompass numerous other arrangements. At least a subset of the plurality of storage system performance models comprise respective linear regression models, although a wide variety of other types of models can be used. Examples of such linear regression models are shown in FIGS. 4A, 4B and 4C.

In step 202, a request is received for a proposed configuration of a storage system. The request illustratively comprises a request received from a client device over a network in a processing platform that implements the web-based sizing tool. Alternatively, the request can be received directly in the web-based sizing tool itself via an associated web interface deployed as part of that tool. The request in some embodiments is generated at least in part in a web browser of the client device. It illustratively includes information relating to storage requirements, such as desired capacity and desired performance.

By way of example, the request in some embodiments explicitly specifies a particular processor or set of processors to be utilized in implementing the storage system. As another example, the particular processor or set of processors to be utilized in implementing the storage system can be inferred or otherwise identified by the web-based sizing tool using the information contained in the request. In these and other arrangements, information in the request is used to identify at least one processor to be utilized in implementing the storage system. The term "request" as used herein is intended to be broadly construed, so as to encompass, for example, multiple separate communications received from a client device that collectively indicate a desire on the part of a system user to receive a proposed configuration of a storage system from the web-based sizing tool.

Such requests can be generated in a wide variety of different contexts. For example, if a customer is planning to implement a new storage solution, the customer illustratively has a capacity requirement as well as a set of performance requirements involving parameters such as latency and IOPS. The performance requirements are illustratively driven at least in part based on the particular applications which will be using the storage system. Another example is a customer that wants to upgrade from an older set of servers with older CPUs to newer servers with newer CPUs, in which case the customer would want to know the performance improvement to expect after the upgrade. A wide variety of other types of requests can be directed to the web-based sizing tool in other embodiments.

In step 204, a particular one of the models is selected based at least in part on the identified processor. For example, the distinct models maintained in step 200 illustratively comprise at least a first set of one or more models for processors of a first type, and a second set of one or more models for processors of a second type different than the first type, with the particular model being selected based on the type of the identified processor. Other types of model selection based at least in part on the identified processor can be used.

In step 206, a performance metric is computed for the storage system utilizing the selected model and one or more characteristics of the identified processor. The one or more characteristics of the identified processor are obtained from one or more sources of processor characteristics that are external to the processing platform that implements the web-based sizing tool. Alternatively, the processing platform can implement one or more internal databases that store processor characteristics for large numbers of different processors or sets of processors that may be used in implementing a storage system.

The performance metric illustratively comprises a throughput metric for the storage system, such as an IOPS metric, although a wide variety of other metrics can be used. Advantageously, the performance metric for the storage system is computed utilizing the selected storage system performance model and one or more characteristics of the identified processor without requiring any testing of the proposed configuration of the storage system. For example, computing the performance metric for the storage system utilizing the selected storage system performance model and one or more characteristics of the identified processor illustratively comprises applying a function of the one or more characteristics of the identified processor as input to the selected storage system performance model.

In step 208, presentation output is generated that includes the performance metric, possibly in combination with information characterizing at least a portion of the proposed configuration of the storage system. An example of such presentation output will be described in more detail below in conjunction with FIG. 3D. The presentation output illustratively comprises one or more web pages or portions thereof suitable for conveying the performance metric to the client device in association with the information characterizing at least a portion of the proposed configuration of the storage system. For example, web pages returned by the web-based sizing tool to a requesting client device can include multiple performance metrics for respective different proposed configurations of the storage system, each possibly based at least in part on a different identified processor or set of processors.

The one or more proposed configurations illustratively comprise recommended configurations of the storage system that are determined by the web-based sizing tool based at least in part on the above-noted request. A wide variety of other types of visualizations or other presentation output may be generated by the web-based sizing tool to convey the performance metric and proposed configuration to a web browser or other interface of a requesting client device. The term "presentation output" as used herein is therefore intended to be broadly construed, so as to encompass, for example, any type of information that is generated by the web-based sizing tool and utilized in conjunction with presenting at least the performance metric in a perceptible manner to a user of a client device.

In step 210, a determination is made as to whether or not the identified processor or any other aspects of the proposed configuration have been modified by the user. For example, the user may have modified the above-noted information relating to storage requirements, such as desired capacity and desired performance. Additionally or alternatively, the user may have modified its initial request through submission of one or more new requests to the web-based sizing tool, possibly providing information that is used to identify a different processor for the proposed configuration of the storage system.

If the identified processor or any other aspects of the proposed configuration have been modified by a user, the process returns to step 204 to once again select a model. This may be a different model that that selected in the previous iteration of step 204. For example, if the identified processor has changed, a different model appropriate for use with that processor is illustratively selected. FIGS. 4A and 4B show examples of different models associated with different processor types.

If the identified processor or any other aspects of the proposed configuration have not been modified by a user, the process returns to step 200 to continue maintaining the storage system performance models, and to await receipt of another request for a proposed configuration of a storage system, possibly from a different client device than that from which the request was received in a previous iteration of step 202.

In some embodiments, various automated processing operations may be performed utilizing outputs of a web-based sizing tool in conjunction with the FIG. 2 process. For example, such outputs can be utilized in a machine learning system or other type of AI system in order to refine the storage system performance models or other aspects of operation of the web-based sizing tool. Numerous other types of automated processing operations can be performed in other embodiments.

The particular processing operations and other system functionality described in conjunction with the flow diagram of FIG. 2 are presented by way of illustrative example only, and should not be construed as limiting the scope of the disclosure in any way. Alternative embodiments can use other types of processing operations for implementing techniques for estimating storage system performance as a function of characteristics of one or more candidate processors. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different process instances for handling respective different received requests within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Additional illustrative embodiments of information processing systems configured to estimate storage system performance as a function of characteristics of one or more candidate processors will now be described with reference to FIGS. 3 and 4.

Figure 3A:
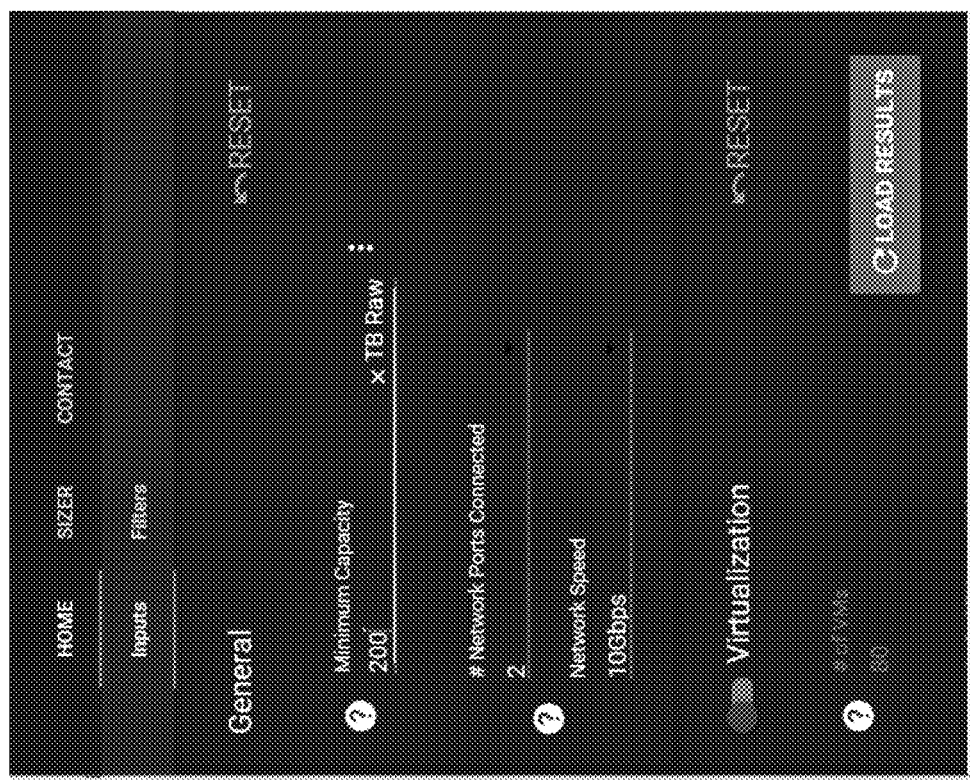
Figure 3B:
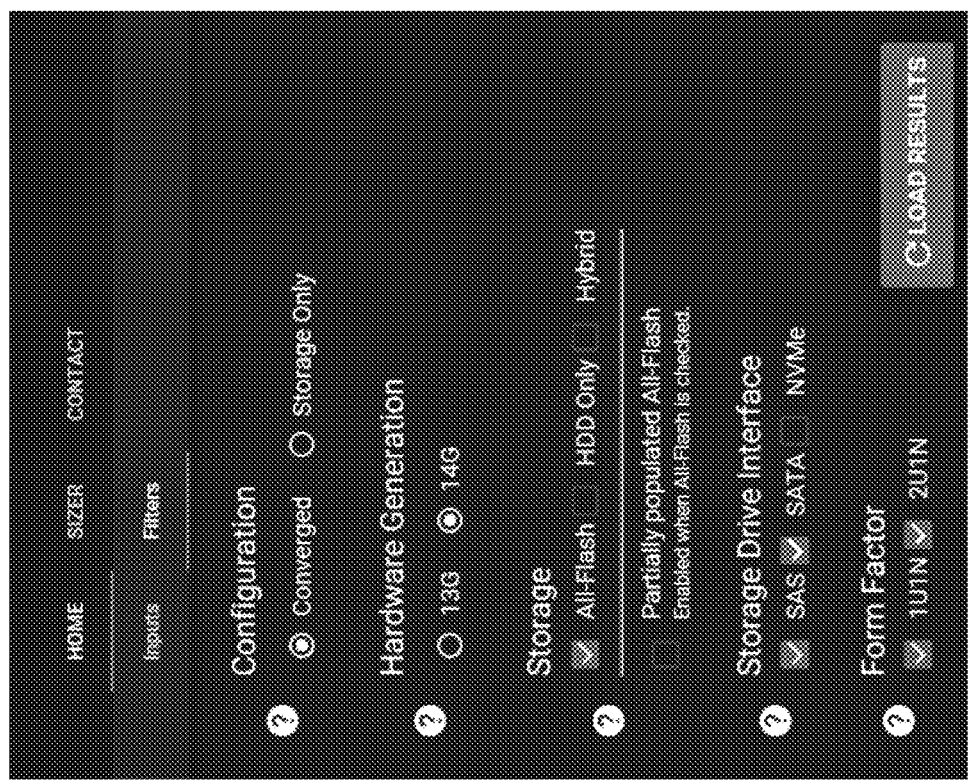
Figure 3C:
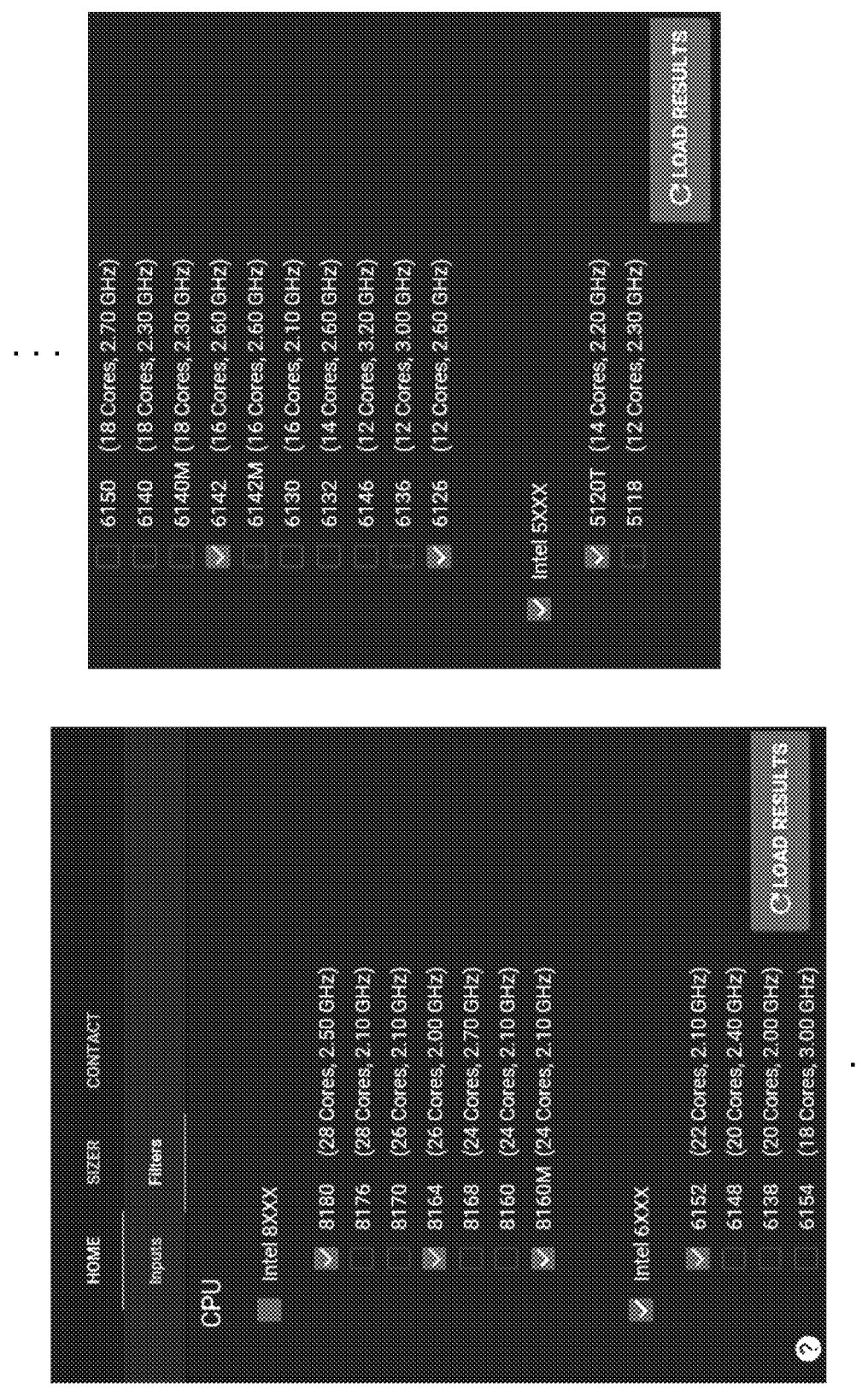
Figure 3D:
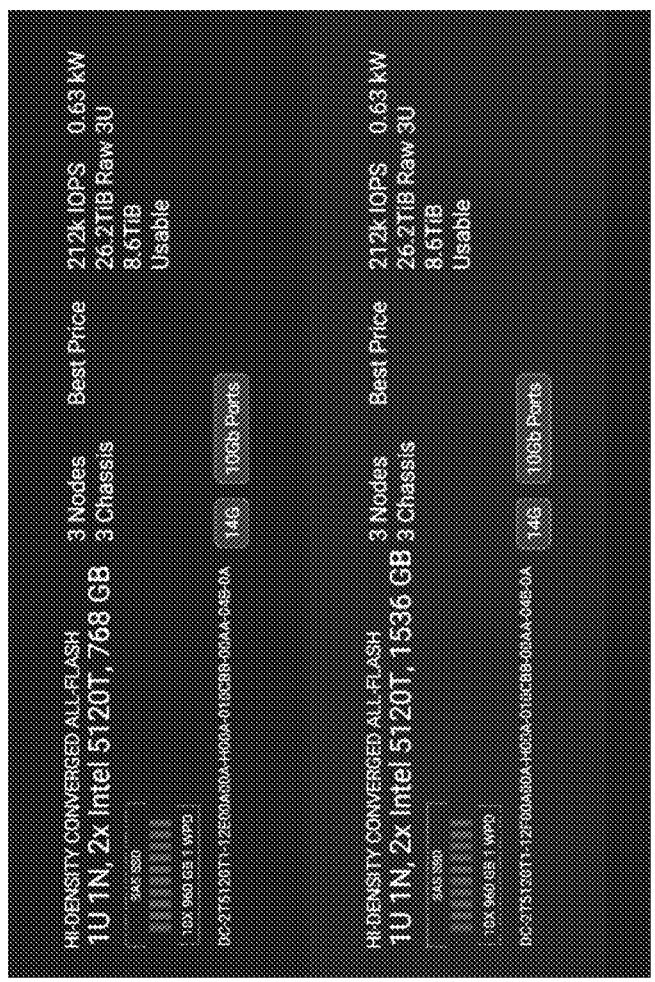

Referring initially to FIG. 3, a number of screenshots of a web-based sizing tool are shown. The screenshots are part of a user interface through which a user at a client device interacts with the web-based sizing tool over a network. The screenshots illustratively comprise interactive web pages that are served over the network to the client device and that are configured to include various icons, widgets or other data entry mechanisms through which the user conveys a request for a proposed configuration of a storage system to the web-based sizing tool. Four separate screenshots are shown in respective FIGS. 3A through 3D.

FIG. 3A shows a home page of the web-based sizing tool through which a user enters storage system requirements such as minimum capacity in raw terabytes (TB), number of network ports, network speed in Gigabits per second (Gbps), and number of virtual machines (VMs). Additional pages can be served to allow user specification of other storage system requirements that will be utilized by the web-based sizing tool in generating a given proposed configuration for the user.

FIGS. 3B and 3C show example web pages providing various types of filters through which the user can limit various characteristics of the proposed configuration that will be generated by the web-based sizing tool.

The filters shown in FIG. 3B are configured to permit user selection of a converged configuration versus a storage only configuration, a particular hardware generation (e.g., 13G or 14G), storage type (e.g., all-flash, HDD only, hybrid), storage drive interface (SAS, SATA, NVMe), and form factor (e.g, 1U1N, 2U1N).

The filters shown in FIG. 3C are configured to permit user selection of particular processors or sets of processors, including particular CPU types each with a specified number of cores and a specified frequency in GigaHertz (GHz).

Each of the screenshots in FIGS. 3A through 3C includes an actuatable icon denoted "Load Results" that when clicked or otherwise actuated by the user will send a request for a proposed configuration of a storage system to the web-based sizing tool.

FIG. 3D shows an example of a screenshot comprising presentation output generated by the web-based sizing tool based at least in part on the request. The presentation output in this example comprises multiple recommended storage system configurations that satisfy the user requirements, in association with respective IOPS performance metrics (e.g., 212$k$ IOPS) computed by the web-based sizing tool for each of the proposed configurations. The IOPS computations are performed using a selected model and particular characteristics of the identified processor, as previously described.

Referring now to FIG. 4, three different examples of storage system performance models are illustrated. Each of these examples estimates IOPS in terms of a number of CPU reads as a function of particular characteristics of an identified processor. The models in all of these examples are linear regression models each based on actual physical measurements of a very limited number of storage system configurations, although other types of models could be used in other embodiments. The models are configured to estimate the maximum IOPS a particular CPU can deliver in the proposed configuration based on specific standard CPU characteristics that are published as part of the CPU specifications or otherwise readily available. The models more particularly compute an IOPS performance metric comprising a number of CPU reads as a function of the CPU characteristics. Other embodiments can generate other types of IOPS measures, such as number of writes or number of combined reads and writes, as a function of the CPU characteristics.

FIG. 4A shows an example of a linear regression model for estimating IOPS in terms of number of reads for a first type of processor as a function of a product of the CPU frequency and the CPU power. The model in this example implements a linear regression for a proposed configuration of a storage system implemented using Intel Broadwell (V4) CPUs. The model is of the form y=456.41x+74037, where y=V4 CPU Reads and x=CPU_Freq*CPU_Power. The $R^2$ value for this example model is 0.8566, and indicates the degree to which the regression model fits the measured data. An $R^2$ value of 1.0 indicates that the regression model perfectly fits the measured data. The measured data utilized to generate the regression model of FIG. 4A is as follows:

| Freq * Power | Reads |
|---|---|
| 179 | 142,872 |
| 231 | 181,321 |
| 288 | 223,360 |
| 377 | 230,930 |
| 297 | 217,664 |

FIG. 4B shows an example of a second linear regression model for estimating IOPS in terms of number of reads for a second type of processor, different than the first type of processor noted above, but again as a function of a product of the CPU frequency and the CPU power. The model in this example implements a linear regression for a proposed configuration of a storage system implemented using Intel Skylake (V5) CPUs. The model is of the form y=133.52x+182281, where y=V5 CPU Reads and x=CPU_Freq*CPU_Power. The $R^2$ value for this example model is 0.8780. The measured data utilized to generate the regression model of FIG. 4B is as follows:

| Freq * Power | Reads |
|---|---|
| 325 | 232,782 |
| 450 | 250,638 |
| 600 | 257,000 |
| 300 | 215,776 |
| 242 | 211,106 |

FIG. 4C shows an example of a linear regression model for estimating IOPS in terms of number of reads for the above-noted second type of processor as a function of a product of the CPU frequency, the CPU power and the CPU benchmark performance level, divided by the number of CPU cores. The model in this example implements a linear regression for a proposed configuration of a storage system implemented using V5 CPUs. The model is of the form y=0.9436x+196096, where y=V5 CPU Reads and x=CPU_Freq*CPU_Power*Spec_int/number of cores. The $R^2$ value for this example model is 0.9134, and thus provides an improved fit to the measured data relative to the FIG. 4B model for V5 CPUs, although this type of model does not perform as well as the FIG. 4A model for V4 CPUs. The measured data utilized to generate the regression model of FIG. 4C is as follows:

| Freq * Power * Spec_int/Cores | Reads |
|---|---|
| 29,521 | 232,782 |
| 54,375 | 250,638 |
| 68,333 | 257,000 |
| 23,423 | 215,776 |
| 22,339 | 211,106 |

In generating the above-described linear regression models, IOPS performance measurements are taken on a very limited number of possible storage system configurations that utilize the particular processors or sets of processors. The resulting models are then utilized in computing the IOPS performance of a potentially very large number of other storage system configurations that utilize those processors.

The particular storage system sizing tool interfaces shown in FIG. 3 and the storage system performance models of FIG. 4 are presented by way of illustrative example only, and numerous alternative arrangements of storage system sizing tool interfaces and storage system performance models can be used in other embodiments.

Illustrative embodiments of information processing systems configured to estimate storage system performance as a function of characteristics of one or more candidate processors as disclosed herein can provide a number of significant advantages relative to conventional arrangements.

For example, some illustrative embodiments are in the form of a web-based storage system sizing tool that can advantageously provide highly accurate and efficient estimates of IOPS performance for a given storage system configuration without the need for explicit testing of that configuration.

Accordingly, illustrative embodiments can provide a high degree of assurance that a given configured storage system when actually deployed in the field will provide the IOPS performance that was expected by its purchaser.

Such arrangements can advantageously help to avoid potentially very costly capacity planning mistakes that might otherwise occur.

These and other embodiments are particularly well-suited for use with estimating performance of storage systems that are implemented at least in part using software-defined storage that can run on general-purpose servers or other commodity hardware, for which there are potentially large numbers of different candidate processor options and associated storage system configurations.

The disclosed techniques can be implemented in a wide variety of different storage capacity planning tools and other types of storage system sizing tools.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for estimating storage system performance as a function of characteristics of one or more candidate processors will now be described in greater detail with reference to FIGS. 5 and 6. Although described in the context of system 100, these platforms may also be used to implement at least portions of other information processing systems in other embodiments.

Figure 5:
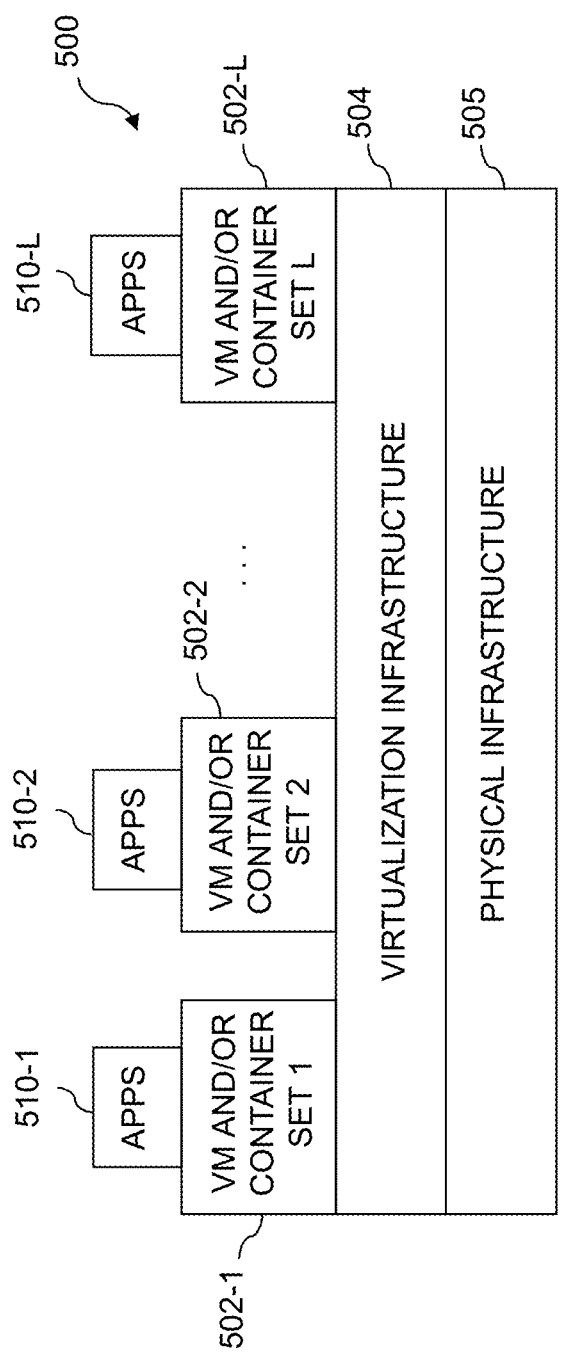
FIGS. 5 and 6 show examples of processing platforms that may be utilized to implement at least a portion of an information processing system in illustrative embodiments.
Figure 6:
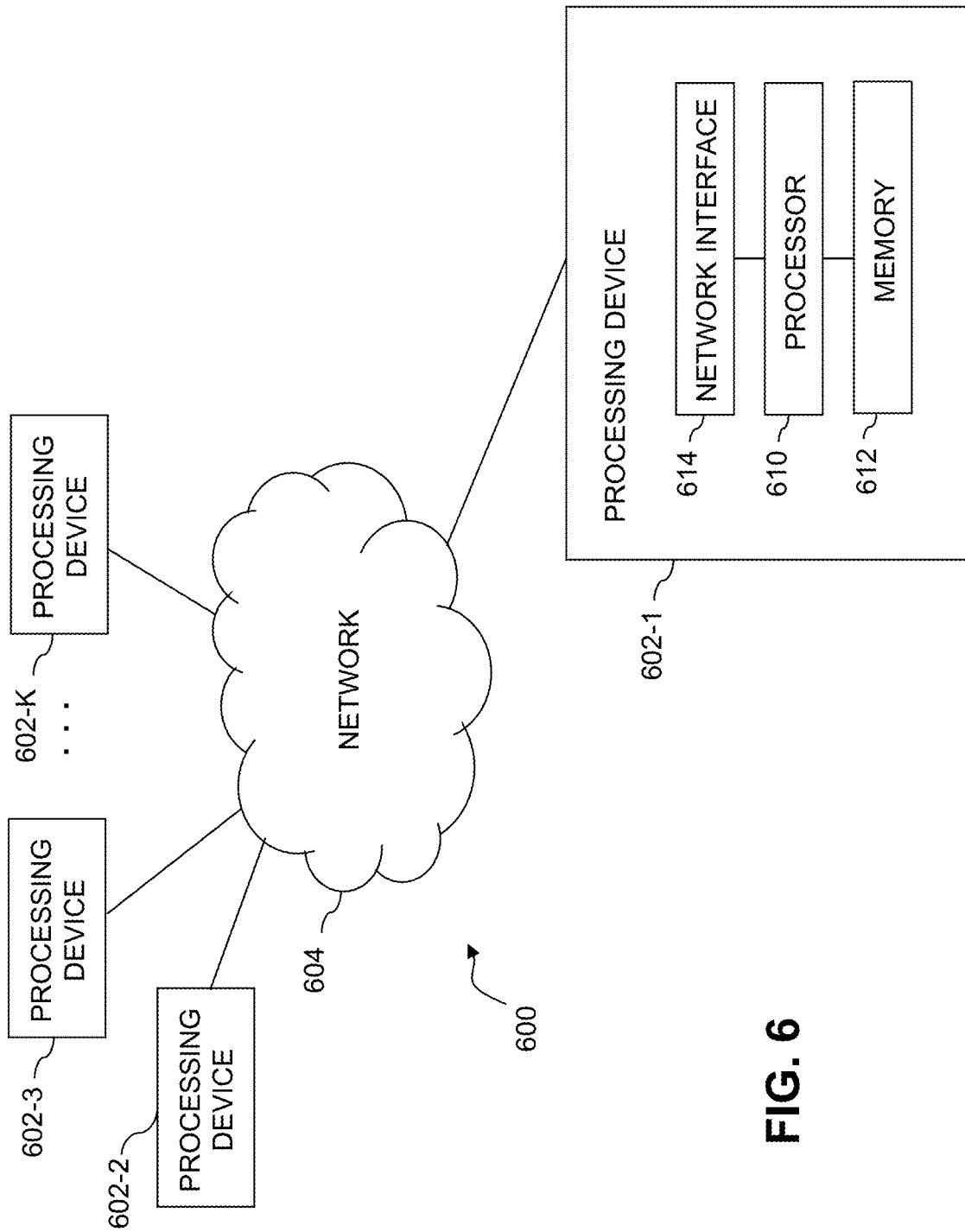

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide storage system performance estimation functionality of the type described above utilizing one or more processes running on a given one of the VMs. For example, the given VM can execute at least portions of one or more instances of the FIG. 2 process for storage system performance estimation.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide storage system performance estimation functionality of the type described above utilizing one or more processes running on a given one of the containers. For example, the given container can execute at least portions of one or more instances of the FIG. 2 process for storage system performance estimation.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the techniques for estimating storage system performance as a function of characteristics of one or more candidate processors as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, processing platforms, storage system sizing tools, storage system performance models and performance metrics, and associated processing operations. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    a processing platform comprising a plurality of processing devices;
    the processing platform being configured to communicate over a network with one or more client devices;
    the processing platform being further configured:
    to receive a request from a given one of the client devices for a proposed configuration of a storage system;
    to identify based at least in part on the received request at least one processor to be utilized in implementing the storage system;
    to select a particular one of a plurality of storage system performance models based at least in part on the identified processor;
    to compute a performance metric for the storage system utilizing the selected storage system performance model and one or more characteristics of the identified processor;
    to generate presentation output comprising: (i) the performance metric, and (ii) information characterizing at least a portion of the proposed configuration of the storage system; and
    to deliver the presentation output to the given client device over the network.

2. The apparatus of claim 1 wherein the processing platform implements a web-based sizing tool configured to perform at least portions of the receiving, identifying, selecting, computing, generating and delivering.

3. The apparatus of claim 1 wherein the performance metric for the storage system comprises a throughput metric for the storage system.

4. The apparatus of claim 3 wherein the throughput metric for the storage system comprises an input/output operations per second (IOPS) metric.

5. The apparatus of claim 1 wherein the performance metric for the storage system is computed utilizing the selected storage system performance model and one or more characteristics of the identified processor without requiring any testing of the proposed configuration of the storage system.

6. The apparatus of claim 1 wherein the one or more characteristics of the identified processor are obtained from one or more sources of processor characteristics that are external to the processing platform.

7. The apparatus of claim 1 wherein computing a performance metric for the storage system utilizing the selected storage system performance model and one or more characteristics of the identified processor comprises applying a function of the one or more characteristics of the identified processor as input to the selected storage system performance model.

8. The apparatus of claim 1 wherein at least a subset of the plurality of storage system performance models comprise respective linear regression models.

9. The apparatus of claim 1 wherein the one or more characteristics of the identified processor comprise at least one of:
    a frequency of the processor;
    a power of the processor;
    a number of cores of the processor; and
    a benchmark performance level of the processor.

10. The apparatus of claim 9 wherein the selected storage system performance model receives as its input a value computed as a function of two or more of the frequency, the power, the number of cores and the benchmark performance level.

11. The apparatus of claim 9 wherein the benchmark performance level of the processor comprises at least one of a published integer processing performance level of the processor and a published floating point processing performance level of the processor.

12. The apparatus of claim 1 wherein the one or more characteristics of the identified processor comprise a frequency of the processor and a power of the processor and wherein the selected storage system performance model receives as its input a product of the frequency and the power.

13. The apparatus of claim 1 wherein the one or more characteristics of the identified processor comprise a frequency of the processor, a power of the processor, a number of cores of the processor, and a benchmark performance level of the processor, and wherein the selected storage system performance model receives as its input a product of the frequency, the power and the benchmark performance level, divided by the number of cores.

14. The apparatus of claim 1 wherein the plurality of storage system performance models comprise at least:
    a first set of one or more models for processors of a first type; and
    a second set of one or more models for processors of a second type different than the first type.

15. A method comprising:
    receiving a request from a given client device over a network for a proposed configuration of a storage system;
    identifying based at least in part on the received request at least one processor to be utilized in implementing the storage system;
    selecting a particular one of a plurality of storage system performance models based at least in part on the identified processor;
    computing a performance metric for the storage system utilizing the selected storage system performance model and one or more characteristics of the identified processor;

generating presentation output comprising: (i) the performance metric, and (ii) information characterizing at least a portion of the proposed configuration of the storage system; and delivering the presentation output to the given client device over the network;

wherein the method is performed by a processing platform comprising a plurality of processing devices.

16. The method of claim 15 wherein the processing platform implements a web-based sizing tool configured to perform at least portions of the receiving, identifying, selecting, computing, generating and delivering.

17. The method of claim 15 wherein computing a performance metric for the storage system utilizing the selected storage system performance model and one or more characteristics of the identified processor comprises applying a function of the one or more characteristics of the identified processor as input to the selected storage system performance model.

18. A computer program product comprising a non-transitory processor-readable storage medium having stored therein program code of one or more software programs, wherein the program code when executed by a processing platform comprising a plurality of processing devices causes the processing platform:

to receive a request from a given client device over a network for a proposed configuration of a storage system;

to identify based at least in part on the received request at least one processor to be utilized in implementing the storage system;

to select a particular one of a plurality of storage system performance models based at least in part on the identified processor;

to compute a performance metric for the storage system utilizing the selected storage system performance model and one or more characteristics of the identified processor;

to generate presentation output comprising: (i) the performance metric, and (ii) information characterizing at least a portion of the proposed configuration of the storage system; and to deliver the presentation output to the given client device over the network.

19. The computer program product of claim 18 wherein the processing platform implements a web-based sizing tool configured to perform at least portions of the receiving, identifying, selecting, computing, generating and delivering.

20. The computer program product of claim 18 wherein computing a performance metric for the storage system utilizing the selected storage system performance model and one or more characteristics of the identified processor comprises applying a function of the one or more characteristics of the identified processor as input to the selected storage system performance model.

* * * * *